United States Patent
Kwon

(10) Patent No.: US 9,489,034 B2
(45) Date of Patent: Nov. 8, 2016

(54) METHOD AND APPARATUS FOR CONTROLLING OPERATION VOLTAGE OF PROCESSOR CORE, AND PROCESSOR SYSTEM INCLUDING THE SAME

(71) Applicant: Electronics and Telecommunications Research Institute, Daejeon (KR)

(72) Inventor: Young-Su Kwon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 270 days.

(21) Appl. No.: 14/256,402

(22) Filed: Apr. 18, 2014

(65) Prior Publication Data
US 2014/0359316 A1    Dec. 4, 2014

(30) Foreign Application Priority Data

May 30, 2013 (KR) .................. 10-2013-0062016
Feb. 11, 2014 (KR) .................. 10-2014-0015522

(51) Int. Cl.
*G06F 1/26* (2006.01)
*G06F 1/32* (2006.01)
*G06F 1/30* (2006.01)

(52) U.S. Cl.
CPC ............... *G06F 1/3243* (2013.01); *G06F 1/30* (2013.01); *Y02B 60/1239* (2013.01)

(58) Field of Classification Search
CPC .... G06F 1/30; G06F 1/3243; Y02B 60/1239
See application file for complete search history.

(56) References Cited

U.S. PATENT DOCUMENTS

| | | | |
|---|---|---|---|
| 6,148,408 A | * | 11/2000 | Shimoda ............... G06F 1/3203 713/300 |
| 7,392,413 B2 | | 6/2008 | Shikata |
| 2005/0188230 A1 | | 8/2005 | Bilak |
| 2005/0283630 A1 | | 12/2005 | Shikata |
| 2006/0074576 A1 | | 4/2006 | Patel |
| 2006/0253715 A1 | | 11/2006 | Ghiasi et al. |
| 2006/0259840 A1 | | 11/2006 | Abadeer et al. |
| 2007/0220293 A1 | * | 9/2007 | Takase ............... G06F 1/3203 713/320 |
| 2007/0300082 A1 | | 12/2007 | Muraki et al. |
| 2009/0044044 A1 | | 2/2009 | Harter et al. |
| 2010/0188115 A1 | | 7/2010 | Von Kaenel |
| 2011/0221483 A1 | | 9/2011 | Liu et al. |
| 2012/0131356 A1 | | 5/2012 | Han |

FOREIGN PATENT DOCUMENTS

JP       2006-004338 A      1/2006

* cited by examiner

*Primary Examiner* — M Elamin

(57) ABSTRACT

A method and an apparatus for controlling an operation voltage of a processor core and a processor system including the same are provided. The apparatus for controlling an operation voltage of a processor core includes a voltage supplier and an operation voltage searching core. The voltage supplier supplies the operation voltage to the processor core. The operation voltage searching core requests the processor core to execute a program, and controls the operation voltage based on whether the program has been normally operated.

19 Claims, 3 Drawing Sheets

METHOD AND APPARATUS FOR CONTROLLING OPERATION VOLTAGE OF PROCESSOR CORE, AND PROCESSOR SYSTEM INCLUDING THE SAME

CROSS-REFERENCE TO RELATED APPLICATION

This application claims priority to and the benefit of Korean Patent Application No. 10-2013-0062016, 10-2014-0015522 filed in the Korean Intellectual Property Office on May 30, 2013 and Feb. 11, 2014, respectively, the entire contents of which are incorporated herein by reference.

BACKGROUND OF THE INVENTION (a) Field of the Invention

The present invention relates to a method and an apparatus for controlling an operation voltage of a processor core, and a processor system including the same.

(b) Description of the Related Art

A processor core reads instructions stored in a storage unit such as a memory or a disk, performs a specific operation depending on an operation encoded in the instructions, and stores a performance result. That is, the processor core is hardware or intellectual property (IP) executing an algorithm for a specific application area.

An application area of the processor core has been widely applied over all system semiconductor fields. An application area of the processor core has been applied to various areas such as high performance media data processing for large-capacity multimedia data, a minimum performance micro-controller platform, an apparatus to which power may not be stably supplied or to which power may not be supplied from the outside, and the like. As the large-capacity multimedia data, there are video data compression and decompression, audio data modification, sound effects, and the like. As the minimum performance micro-controller platform, there are a wired/wireless communication modem, a voice codec algorithm, network data processing, a touch screen, a home appliance controller, a motor control, and the like. As the apparatus to which power may not be stably supplied or to which power may not be supplied from the outside, there are a wireless sensor network, tiny electronic devices, and the like.

The processor core includes an instruction execution logic, a translation lookaside buffer (TLB), and a cache memory. A task to be executed by the instruction execution logic is composed of a combination of a plurality of instructions. That is, the instructions are stored in the memory and are sequentially input to the instruction execution logic, and the instruction execution logic performs a specific calculation per clock period. The TLB serves to convert a virtual address into a physical address in order to drive an operating system based application. The cache memory temporarily stores instructions stored in an external memory in a chip (chip of the processor core) to increase a speed of the processor core.

Power consumption of the processor core is configured of dynamic power consumption and static power consumption. The dynamic power consumption $P_{dynamic}$ is represented by $P_{dynamic} = \alpha f c V_{dd}^2$. Here, $\alpha$ indicates a switching probability, f indicates an operation frequency, c indicates a switching capacitance, and $V_{dd}$ indicates an operation voltage. The static power consumption $P_{static}$ is represented by $P_{static} = I_{static} V_{dd}$. Here, $I_{static}$ indicates an average current that flows statically. Both of the dynamic power consumption and the static power consumption are decreased as the operation voltage is decreased. Particularly, the dynamic power consumption is more rapidly decreased when the operation voltage is decreased.

Meanwhile, when the operation voltage is decreased, an operation frequency of the processor core is also decreased, such that performance may be decreased. However, generally, the performance is linearly decreased, while the dynamic power consumption is exponentially decreased. Therefore, when the operation voltage is decreased, power efficiency (power consumption per unit frequency) is increased. Particularly, in a sensor application requiring a long operation time, it is an important factor of a design to decrease the power consumption.

As described above, it is important to decrease the operation voltage in order to decrease the power consumption. However, in the case of a processor core configured of a complementary metal oxide semiconductor (CMOS), when an operation voltage is decreased to a predetermined voltage or less, a circuit may not be appropriately operated. That is, an operation voltage margin is not sufficient, such that normal operation of the circuit may be impossible. In addition, since a minimum voltage at which any circuit may be operated is changed depending on current consumption, a temperature, and characteristics when a chip is manufactured, there is a problem that it is difficult to determine a minimum voltage value after the chip is designed.

The above information disclosed in this Background section is only for enhancement of understanding of the background of the invention and therefore it may contain information that does not form the prior art that is already known in this country to a person of ordinary skill in the art.

SUMMARY OF THE INVENTION

The present has been made in an effort to provide a method and an apparatus for controlling an operation voltage of a processor core, and a processor system including the same, having advantages of controlling a minimum voltage at which the processor core may be operated.

An exemplary embodiment of the present invention provides an apparatus for controlling an operation voltage of a processor core. The apparatus for controlling an operation voltage of a processor core includes: a voltage supplier supplying the operation voltage to the processor core; and an operation voltage searching core requesting the processor core to execute a program and controlling the operation voltage based on whether the program has been normally operated.

The operation voltage searching core may set the operation voltage to a first voltage level and may set the operation voltage to a second voltage level higher than the first voltage level in the case in which the program is not normally operated in a state of the first voltage level.

The operation voltage searching core may set the operation voltage to a first voltage level, and may determine the first voltage level to be a minimum voltage of the operation voltage in the case in which the program is normally operated in a state of the first voltage level.

The apparatus for controlling an operation voltage of a processor core may further include a wake-up timer transmitting a wake-up signal to the operation voltage searching core, wherein the operation voltage search core performs an operation of controlling the operation voltage in the case in which it receives the wake-up signal from the wake-up timer.

The operation voltage searching core may request the wake-up timer to transmit the wake-up signal after a predetermined delay time in the case in which the program is normally operated.

The voltage supplier may supply a first voltage required for operating the operation voltage searching core.

The voltage supplier may turn off the first voltage in the case in which the operation voltage searching core determines that the program has been normally operated.

The apparatus for controlling an operation voltage of a processor core may further include a voltage level converter converting a voltage level of a signal output by the operation voltage searching core and a voltage level of a signal output by the processor core so as to be the same as each other.

The apparatus for controlling an operation voltage of a processor core may further include a voltage controller controlling the voltage supplier to control the operation voltage in the case in which it is requested to control the operation voltage from the operation voltage searching core.

Another exemplary embodiment of the present invention provides a method for controlling an operation voltage of a processor core. The method for controlling an operation voltage of a processor core includes: supplying a first voltage level to the processor core; requesting the processor core to execute a program in a state of the first voltage level; checking whether the processor core has normally executed the program; and determining the first voltage level to be a minimum level of the operation voltage in the case in which it is determined in the checking that the processor core has normally executed the program.

The method for controlling an operation voltage of a processor core may further include: supplying a second voltage level higher than the first voltage level to the processor core in the case in which it is determined in the checking that the processor core has not normally executed the program.

The method for controlling an operation voltage of a processor core may further include: requesting the processor core to execute the program in a state of the second voltage level; and determining the second voltage level to be a minimum level of the operation voltage in the case in which the processor core normally executes the program.

The method for controlling an operation voltage of a processor core may further include turning off a voltage supplied to the processor core in the case in which it is determined in the checking that the processor core has normally executed the program.

The requesting may include: downloading the program to a memory connected to the processor core; and requesting the processor core to execute the program stored in the memory.

The checking may include: reading a result value of the program executed by the processor; and comparing the result value of the program with a pre-possessed value.

Yet another exemplary embodiment of the present invention provides a processor system. The processor system includes: a processor including a main memory and a processor core executing a program stored in the main memory; and an operation voltage controlling apparatus controlling an operation voltage of the processor core depending on whether or not the processor core has normally executed the program.

The operation voltage controlling apparatus may include: a voltage supplier supplying the operation voltage to the processor core; and an operation voltage searching core downloading the program to the main memory, requesting the processor core to execute the program, and determining whether the program is normally operated to control the operation voltage.

The operation voltage controlling apparatus may supply a first voltage level as the operation voltage to the processor core, and may supply a second voltage level higher than the first voltage level to the processor core in the case in which the processor core has not normally executed the program in a state of the first voltage level.

The operation voltage controlling apparatus may supply a first voltage level as the operation voltage to the processor core, and may continuously supply the first voltage level as the operation voltage to the processor core in the case in which the processor core normally executes the program in a state of the first voltage level The voltage supplier may supply a first voltage required for operating the operation voltage searching core, and the voltage supplier may not supply the first voltage to the operation voltage searching core in the case in which the operation voltage searching core determines that the program has been normally operated.

According to an exemplary embodiment of the present invention, a minimum operation voltage of a processor core is set based on whether the processor core has normally performed a program, thereby making it possible to obtain an operation voltage of the processor core matched to an actual situation.

In addition, according to an exemplary embodiment of the present invention, a main component in an apparatus for controlling an operation voltage is turned off after an operation voltage search is performed, thereby making it possible to further decrease power consumption.

DETAILED DESCRIPTION OF THE EMBODIMENTS

Figure 1:
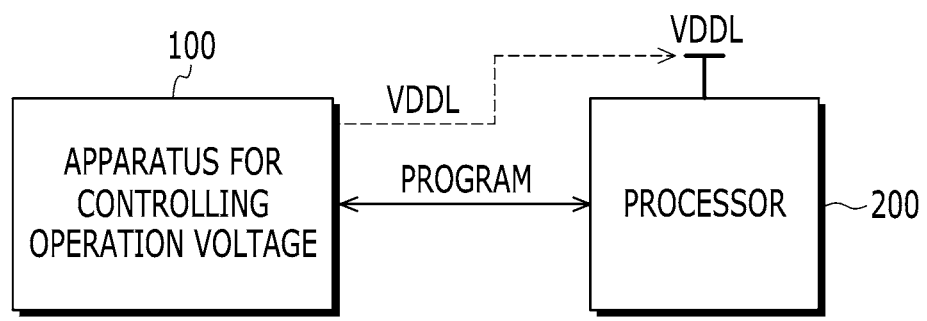
FIG. 1 is a drawing showing a processor system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

In addition, the terms "-er", "-or", and "module" described in the specification mean units for processing at least one function and operation, and can be implemented by hardware components or software components and combinations thereof.

Hereinafter, a method and an apparatus for controlling an operation voltage of a processor core according to an exemplary embodiment of the present invention will be described in detail.

First, an apparatus for controlling an operation voltage of a processor core according to an exemplary embodiment of the present invention, and a processor system including the same, will be described in detail with reference to FIGS. 1 and 2.

FIG. 1 is a drawing showing a processor system according to an exemplary embodiment of the present invention.

As shown in FIG. 1, the processor system according to an exemplary embodiment of the present invention is configured to include an apparatus 100 for controlling an operation voltage and a processor 200.

As shown in FIG. 1, the processor 200 according to an exemplary embodiment of the present invention is driven by an operation voltage VLLD, which is controlled by the apparatus 100 for controlling an operation voltage. In addition, a processor core 210 (see FIG. 2) included in the processor 200 is driven by the operation voltage VDDL.

In order to obtain maximum power efficiency with minimum power consumption, it is required to set the operation voltage VDDL to a minimum voltage. However, in the case in which the operation voltage VDDL is decreased to a predetermined voltage or less, the processor core 210 (see FIG. 2) may not be appropriately operated. That is, when the operation voltage VDDL is the predetermined voltage or less, an instruction execution logic (for example, a flip-flop) or a cache memory in the processor core 210 (see FIG. 2) may lose stored instructions and data or may store an erroneous voltage. As a result, the processor core 210 (see FIG. 2) may not be normally operation, and an intended instruction may not be followed. A principle that the processor core 210 (see FIG. 2) is not appropriately operated depending on a value of the operation voltage VDDL as described above is used in the apparatus 100 for controlling an operation voltage according to an exemplary embodiment of the present invention.

The apparatus 100 for controlling an operation voltage according to an exemplary embodiment of the present invention downloads a predetermined program to the processor 200 and sets the operation voltage VDDL to a predetermined value. Here, the predetermined program, which is a program for searching an operation voltage, may be any program such as a video data compression program, an audio data compression program, or the like. Hereinafter, the predetermined program is called "a program for searching an operation voltage". In addition, when the apparatus 100 for controlling an operation voltage instructs the processor 200 to execute the program for searching an operation voltage, the processor 200 executes the program for searching an operation voltage. The apparatus 100 for controlling an operation voltage receives a result value of the program for searching an operation voltage executed by the processor 200 and controls the operation voltage VDDL depending on whether the received result value is a pre-possessed (predetermined) value. For example, in the case in which the received result value is the pre-possessed value, the apparatus 100 for controlling an operation voltage sets a preset operation voltage VDDL value to a minimum operation voltage value. In the case in which the received result value is not the pre-possessed value, the apparatus 100 for controlling an operation voltage sets a voltage value higher than the preset operation voltage VDDL value to the minimum operation voltage value and again performs the above-mentioned operation.

As described above, the apparatus 100 for controlling an operation voltage according to an exemplary embodiment of the present invention searches the minimum operation voltage at which the processor 200 (particularly, the processor core) is normally operated while controlling the operation voltage VDDL.

Next, the apparatus 100 for controlling an operation voltage and the processor 200 according to an exemplary embodiment of the present invention will be described with reference to FIG. 2.

Figure 2:
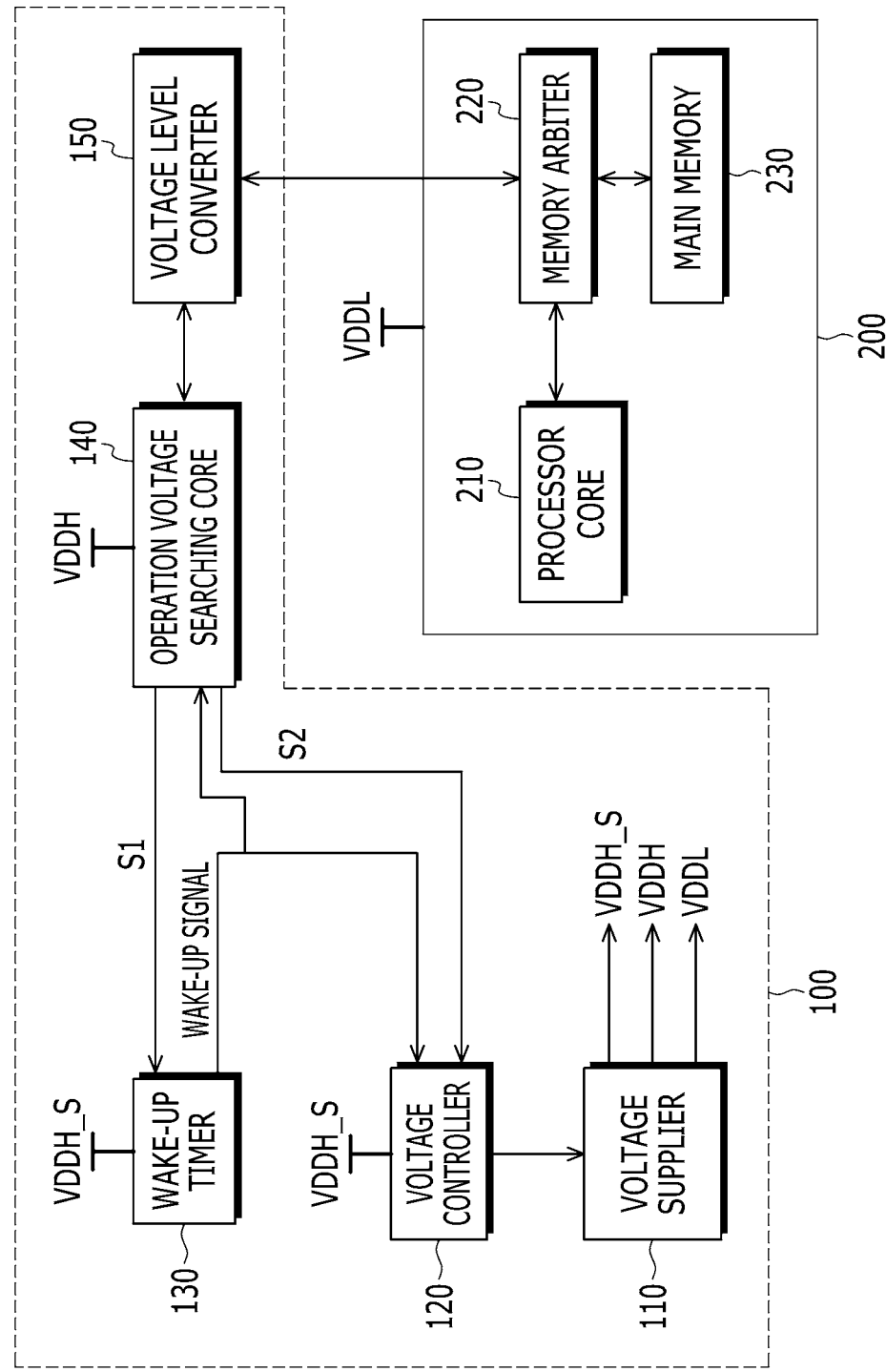
FIG. 2 is a drawing showing an apparatus 100 for controlling an operation voltage and a processor 200 according to an exemplary embodiment of the present invention.

FIG. 2 is a drawing showing the apparatus 100 for controlling an operation voltage and the processor 200 according to an exemplary embodiment of the present invention.

As shown in FIG. 2, the processor 200 according to an exemplary embodiment of the present invention is configured to include the processor core 210, a memory arbiter 220, and a main memory 230.

The processor core 210 is operated by the operation voltage VDDL and includes an instruction execution logic, a translation lookaside buffer (TLB), and a cache memory. The processor core 210 reads a program from the main memory 230 through the memory arbiter 220 and executes the program. In addition, the processor core 210 stores a value obtained by executing the program in the main memory 230 through the memory arbiter 220. In an exemplary embodiment of the present invention, it is required to set the operation voltage VDDL operating the processor core 210 to a minimum voltage.

The main memory 230 stores the program (instruction) to be executed by the processor core 210. In addition, the main memory 230 stores the program for searching an operation voltage downloaded from the apparatus 100 for controlling an operation voltage.

The memory arbiter 220 is positioned between the processor core 210 and the main memory 230. The memory arbiter 220 serves to arbitrate in allowing the processor core 210 to read the program (instruction) from the main memory 230 and write a program execution result.

In addition, the memory arbiter 220 serves to arbitrate between the apparatus 100 for controlling an operation voltage and the main memory 230. The program for searching an operation voltage is downloaded from the apparatus 100 for controlling an operation voltage to the main memory 230 through the memory arbiter 220. The program execution result value (that is, a result value obtained by executing the program for searching an operation voltage by the processor core 210) stored in the main memory 230 is also transmitted to the apparatus 100 for controlling an operation voltage through the memory arbiter 220.

As shown in FIG. 2, the apparatus 100 for controlling an operation voltage according to an exemplary embodiment of the present invention is configured to include a voltage supplier 110, a voltage controller 120, a wake-up timer 130, an operation voltage searching core 140, and a voltage level converter 150.

The voltage supplier 110 generates and supplies at least three voltages VDDH_S, VDDH, and VDDL at the time of power-on. The voltage VDDH_S, which is always a constant voltage, is supplied to the wake-up timer 130 and the voltage controller 120. Therefore, the wake-up timer 130 and the voltage controller 120 are always operated at a constant voltage. The voltage supplier 110 supplies or does not supply the voltage VDDH (that is, the voltage VDDH is turned on or turned off), and the voltage VDDH is supplied or is not supplied to the operation voltage searching core 140.

Meanwhile, the voltage supplier 110 sets the operation voltage VDDL to a plurality of voltage levels under control of the voltage controller 120, and the operation voltage VDDL is supplied to the processor 200. The voltage supplier 110 as described above may be implemented by a switching mode power supply. Since the switching mode power supply may be easily implemented by those skilled in the art to which the present invention pertains to, a detailed description thereof will be omitted.

The voltage controller 120 controls the voltage supplier 110 so that the voltage output by the voltage supplier 110 is varied. The voltage controller 120 receives the voltage VDDH_S from the voltage supplier 110 at the time of the power-on to be normally operated, and then controls the voltage supplier 110 so that the voltage VDDH becomes a voltage equal to the voltage VDDH_S. In addition, in the case in which the voltage controller 120 receives a control signal S2 from the operation voltage searching core 140 instructing the voltage controller 120 to vary the voltage VDDL, the voltage controller 120 controls the voltage supplier 110 to change the voltage VDDL. Meanwhile, in the case in which the voltage controller 120 receives a control signal S2 from the operation voltage searching core 140 instructing the voltage controller 120 to turn off the voltage VDDH, the voltage controller 120 controls the voltage supplier 110 to not supply the voltage VDDH.

The wake-up timer 130 generates a wake-up signal at the time of the power-on, and transmits the generated wake-up signal to the operation voltage searching core 140 and the voltage controller 120. The operation voltage searching core 140 performs an operation of searching a minimum operation voltage VDDL in the case in which it receives the wake-up signal from the wake-up timer 130.

At the time of the power-on, the operation voltage searching core 140 receives the voltage VDDH supplied from the voltage supplier 110 to perform a normal operation. The operation voltage searching core 140 performs an operation of searching a minimum operation voltage VDDL in the case in which it receives the wake-up signal from the wake-up timer 130. First, the operation voltage searching core 140 requests the voltage controller 120 to control the operation voltage VDDL to be a minimum voltage, through the control signal S2. In this case, the voltage controller 120 controls the voltage supplier 110 to output the minimum voltage as the operation voltage. The operation voltage searching core 140 downloads the program for searching an operation voltage to the main memory 230.

Meanwhile, the voltage level converter 150 converts a voltage level of a signal output by the operation voltage searching core 140 and a voltage level of a signal output by the processor 200 so as to be the same as each other. The voltage level of the signal output by the operation voltage searching core 140 is set based on the voltage VDDH, and the voltage level of the signal output by the processor 200 is set based on the voltage VDDL. Therefore, the voltage level converter 150 converts the voltage levels so that data are transmitted between the operation voltage searching core 140 and the main memory 230.

The operation voltage searching core 140 requests the processor core 210 to execute the program for searching an operation voltage and waits until the processor core 210 executes the program for searching an operation voltage. The processor core 210 reads the program for searching an operation voltage from the main memory 230 by the request of the operation voltage searching core 140 and executes the program for searching an operation voltage. In addition, the processor core 210 stores a result value obtained by executing the program for searching an operation voltage in the main memory 230. Here, the operation voltage searching core 140 reads the result value from the main memory 230.

Meanwhile, the operation voltage searching core 140 pre-possesses a normal result value for the program for searching an operation voltage. The operation voltage searching core 140 may compare the pre-possessed normal result value with the result value to determine whether the processor core 210 has performed a normal operation.

The operation voltage searching core 140 increases the operation voltage VDDL to a higher voltage than the initially set operation voltage VDDL in the case in which it is determined that the processor core 210 has not performed the normal operation. The operation voltage searching core 140 again performs the operations such as the program download process, the program execution instruction, and the like described above using the increased operation voltage VDDL.

The operation voltage searching core 140 determines the corresponding operation voltage VDDL to be a minimum operation voltage of the processor core 210 in the case in which it is determined that the processor core 210 has performed the normal operation. In addition, the operation voltage searching core 140 transmits a signal S1 indicating that the operation voltage search has been completed to the wake-up timer 130 in order to minimize power consumption. When the wake-up timer 130 receives the signal S1 indicating that the operation voltage search has been completed, it again transmits a wake-up signal after a predetermined time. In addition, the operation voltage searching core 140 requests the voltage controller 120 to turn off the voltage VDDH through the control signal S2. The voltage controller 120 controls the voltage supplier 110 to not supply the voltage VDDH (that is, the voltage VDDH is turned off). When the voltage VDDH is turned off, the operation voltage searching core 140 is in a turn-off state. Therefore, the operation voltage searching core 140 no longer consumes power. Meanwhile, when the wake-up timer 130 again transmits a wake-up signal after a predetermined time, the voltage VDDH is turned on, and the operation voltage searching core 140 is again operated.

Next, a method for controlling an operation voltage of a processor core according to an exemplary embodiment of the present invention will be described in detail with reference to FIG. 3.

Figure 3:
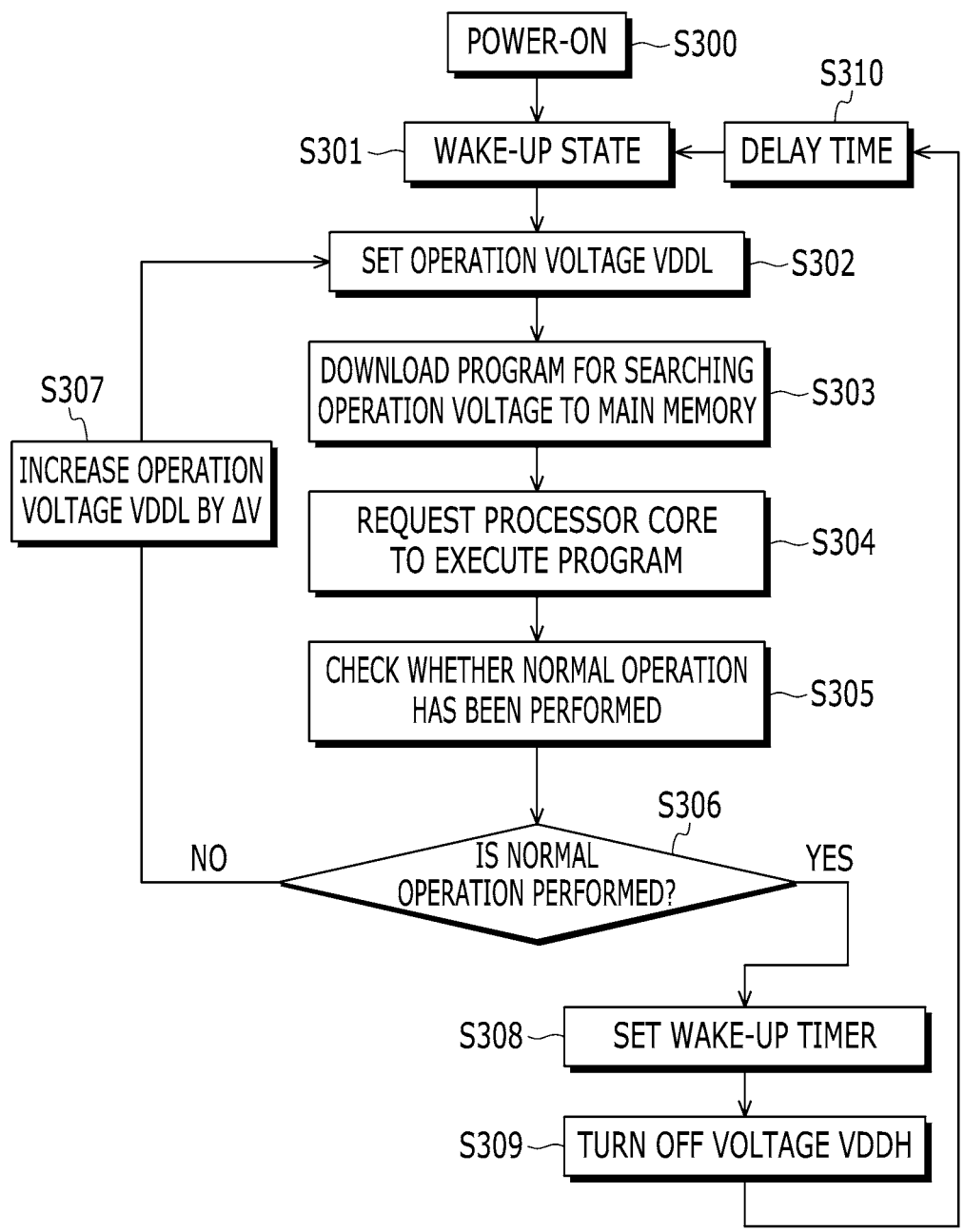
FIG. 3 is a drawing generally showing an operation of an operation voltage searching core 140 according to an exemplary embodiment of the present invention.

FIG. 3 is a drawing generally showing an operation of an operation voltage searching core 140.

After the processor system is powered on, the voltage VDDH_S and the voltage VDDH are stably supplied by the voltage supplier 110.

When the voltage VDDH_S and the voltage VDDH are stably supplied, the operation voltage searching core 140 is in a wake-up state, and starts an operation for searching an operation voltage (S301).

Then, the operation voltage searching core 140 sets the operation voltage VDDL to a predetermined voltage (S302). In this case, the operation voltage searching core 140 sets the operation voltage VDDL as a start value to a minimum voltage. Here, the minimum voltage may be set to about 110% of a threshold voltage operating a semiconductor. Here, the threshold voltage operating the semiconductor may be 0.6 to 0.7 V. The operation voltage searching core 140 transmits the control signal S2 requesting the voltage controller 120 to set the operation voltage VDDL to the minimum voltage to the voltage controller 120, and the voltage controller 120 controls the voltage supplier 110 to supply the corresponding operation voltage VDDL.

The operation voltage searching core 140 downloads the program for searching an operation voltage to the main memory 230 (S303). In this case, the voltage level converter 150 converts the voltage level of the signal so that the program for searching an operation voltage is downloaded to the main memory 230.

Then, the operation voltage searching core 140 requests the processor core 210 to execute the downloaded program (S304). When the processor core 210 receives the request from the operation voltage searching core 140, it executes the program for searching an operation voltage stored in the main memory 230. The processor core 210 stores a result obtained by executing the program in the main memory 230.

The operation voltage searching core 140 checks whether or not the processor core 210 has normally executed the program (S305). The operation voltage searching core 140 reads the program execution result stored in the main memory 230 and compares the program execution result with the pre-possessed normal result value. That is, the operation voltage search core 140 determines that the processor core has performed the normal operation in the case in which the program execution result is the same as the normal result. In addition, the operation voltage search core 140 determines that the processor core has not performed the normal operation in the case in which the program execution result is not the same as the normal result.

In the case in which it is determined in S305 that the processor core 210 has not performed the normal operation, the operation voltage searching core 140 increases the operation voltage VDDL by a predetermined value ($\Delta V$) (S306 and S307). In this case, the operation voltage searching core 140 repeatedly performs S302, S303, S304, and S305 using the increased operation voltage VDDL.

In the case in which it is determined in S305 that the processor core 210 has performed the normal operation, the operation voltage searching core 140 sets the wake-up timer 130 (S306 and S308). That is, the operation voltage searching core 140 transmits the signal S1 indicating that the operation voltage search has been completed to the wake-up timer 160. In addition, in the case in which it is determined in S305 that the processor core 210 has performed the normal operation, the operation voltage searching core 140 determines the corresponding operation voltage VDDL to be a minimum operation voltage of the processor core 210.

In addition, the operation voltage searching core 140 performs an operation of turning off the voltage VDDH (S309) in order to decrease power consumption. In other words, the operation voltage searching core 140 requests the voltage controller 120 to turn off the voltage VDDH through the control signal S2. The voltage controller 120 controls the voltage supplier 110 to not supply the voltage VDDH.

Finally, the wake-up timer 130 again executes a wake-up operation when a predetermined time delay elapses (S310). That is, the wake-up timer 130 transmits the wake-up signal to the operation voltage searching core 140 and the voltage controller 120. In the case in which the operation voltage VDDL does not need to be periodically controlled, S308, S310, and S301 may be omitted.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for controlling an operation voltage of a processor core, comprising:
   a voltage supplier supplying the operation voltage to the processor core;
   an operation voltage searching core requesting the processor core to execute a program and controlling the operation voltage based on whether the program has been normally operated; and
   a wake-up timer transmitting a wake-up signal to the operation voltage searching core,
   wherein the operation voltage searching core performs the controlling of the operation voltage in the case in which it receives the wake-up signal from the wake-up timer.

2. The apparatus for controlling an operation voltage of a processor core of claim 1, wherein the operation voltage searching core sets the operation voltage to a first voltage level, and sets the operation voltage to a second voltage level higher than the first voltage level in the case in which the program is not normally operated in a state of the first voltage level.

3. The apparatus for controlling an operation voltage of a processor core of claim 1, wherein the operation voltage searching core sets the operation voltage to a first voltage level, and determines the first voltage level to be a minimum voltage of the operation voltage in the case in which the program is normally operated in a state of the first voltage level.

4. The apparatus for controlling an operation voltage of a processor core of claim 1, wherein the operation voltage searching core requests the wake-up timer to transmit the wake-up signal after a predetermined delay time in the case in which the program is normally operated.

5. The apparatus for controlling an operation voltage of a processor core of claim 1, wherein the voltage supplier supplies a first voltage required for operating the operation voltage searching core.

6. The apparatus for controlling an operation voltage of a processor core of claim 5, wherein the voltage supplier turns off the first voltage in the case in which the operation voltage searching core determines that the program has been normally operated.

7. The apparatus for controlling an operation voltage of a processor core of claim 1, further comprising
   a voltage level converter converting a voltage level of a signal output by the operation voltage searching core and a voltage level of a signal output by the processor core so as to be the same as each other.

8. The apparatus for controlling an operation voltage of a processor core of claim 1, further comprising
   a voltage controller controlling the voltage supplier to control the operation voltage in the case in which it is requested to control the operation voltage from the operation voltage searching core.

9. A method for controlling an operation voltage of a processor core, the method comprising:
   receiving, by an operation voltage searching core, a wake-up signal from a wake-up timer;
   supplying, by the operation voltage searching core, a first voltage level to the processor core in response to the wake-up signal;
   requesting, by the operation voltage searching core, the processor core to execute a program in a state of the first voltage level;
   checking, by the operation voltage searching core, whether the processor core has normally executed the program; and determining, by the operation voltage searching core, the first voltage level to be a minimum level of the operation voltage in the case in which it is determined in the checking that the processor core has normally executed the program.

10. The method for controlling an operation voltage of a processor core of claim 9, further comprising:
supplying, by the operation voltage searching core, a second voltage level higher than the first voltage level to the processor core in the case in which it is determined in the checking that the processor core has not normally executed the program.

11. The method for controlling an operation voltage of a processor core of claim 10, further comprising:
requesting, by the operation voltage searching core, the processor core to execute the program in a state of the second voltage level; and
determining, by the operation voltage searching core, the second voltage level to be a minimum level of the operation voltage in the case in which the processor core normally executes the program.

12. The method for controlling an operation voltage of a processor core of claim 9, further comprising:
requesting, by the operation voltage searching core, a voltage supplier to turn off a voltage supplied to the operation voltage searching core in the case in which it is determined in the checking that the processor core has normally executed the program.

13. The method for controlling an operation voltage of a processor core of claim 9, wherein the requesting includes:
downloading the program to a memory connected to the processor core; and
requesting the processor core to execute the program stored in the memory.

14. The method for controlling an operation voltage of a processor core of claim 9, wherein the checking includes:
reading a result value of the program executed by the processor; and
comparing the result value of the program with a pre-possessed value.

15. A processor system comprising:
a processor including a main memory and a processor core executing a program stored in the main memory; and
an operation voltage controlling apparatus controlling an operation voltage of the processor core depending on whether or not the processor core has normally executed the program,
wherein the operation voltage controlling apparatus includes:
a voltage supplier supplying the operation voltage to the processor core;
an operation voltage searching core downloading the program to the main memory, requesting the processor core to execute the program, and controlling the operation voltage based on whether the program is normally operated; and
a wake-up timer transmitting a wake-up signal to the operation voltage searching core,
wherein the operation voltage searching core performs the controlling of the operation voltage in the case in which it receives the wake-up signal from the wake-up timer.

16. The processor system of claim 15, wherein the operation voltage controlling apparatus supplies a first voltage level as the operation voltage to the processor core, and supplies a second voltage level higher than the first voltage level to the processor core in the case in which the processor core has not normally executed the program in a state of the first voltage level.

17. The processor system of claim 15, wherein the operation voltage controlling apparatus supplies a first voltage level as the operation voltage to the processor core, and continuously supplies the first voltage level as the operation voltage to the processor core in the case in which the processor core normally executes the program in a state of the first voltage level.

18. The processor system of claim 15, wherein the voltage supplier supplies a first voltage required for operating the operation voltage searching core, and
the voltage supplier does not supply the first voltage to the operation voltage searching core in the case in which the operation voltage searching core determines that the program has been normally operated.

19. The method for controlling an operation voltage of a processor core of claim 9, wherein the method comprises requesting, by the operation voltage searching core, the wake-up timer to transmit the wake-up signal after a predetermined delay time in the case in which the program is normally operated.

* * * * *